UNITED STATES PATENT OFFICE.

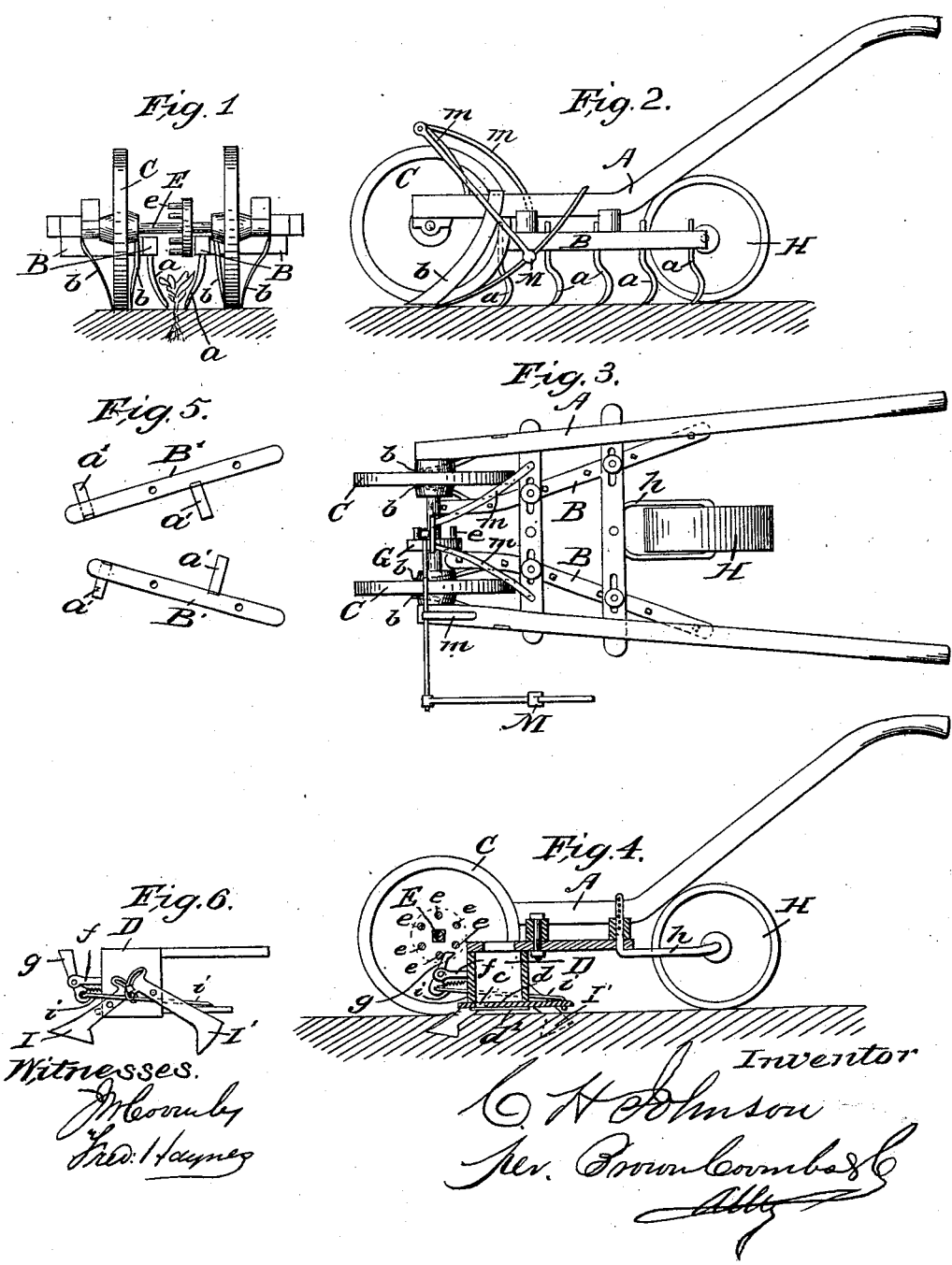

C. H. JOHNSON, OF MORRISTOWN, NEW JERSEY.

IMPROVEMENT IN CULTIVATORS.

Specification forming part of Letters Patent No. 92,835, dated July 20, 1869.

*To all whom it may concern:*

Be it known that I, C. H. JOHNSON, of Morristown, in the county of Morris and State of New Jersey, have invented a new and Improved Cultivator; and I do hereby declare that the following is a full, clear, and exact description of the same, reference being had to the accompanying drawings, forming a part of this specification.

The invention consists, first, in the providing of the attachable and removable teeth of cultivators with inwardly-inclined or converging points for cutting close to the roots of plants, and with outwardly-bowed central and upper parts for passing harmlessly by or over the tops of said plants, and also with rearwardly-inclined central portions in connection with their forwardly-inclined lower extremities, thus placing the points of the teeth upon a perpendicular line with the shanks thereof, whereby greater power is given to the points to resist side pressure, and whereby the downward tendency caused by the springing of the forwardly-inclined lower portions may be counteracted by the upward tendency caused by the springing of the rearwardly-inclined central portions, thereby tending to regulate the penetration of the teeth to a uniform depth.

It consists, secondly, in the providing of a cultivator, in connection with or independently of said teeth, with attachable and removable scrapers having horizontal cutting-edges, for the cutting or shaving off of the weeds and grass from the surface of the ground along the row.

It consists, thirdly, in the combination, with a cultivator, of rollers and knives, whereby the runners of strawberry and other vines may be easily cut by the knives while being held firmly against the ground by the rollers during the passing of the cultivator over the same.

Referring to the accompanying drawings, Figure 1 represents a front view of a cultivator constructed according to my invention. Fig. 2 represents a side view of the same; Fig. 3, a plan view of the same. Fig. 4 represents a longitudinal section of the same, with the teeth removed and seeder attached. Fig. 5 represents a plan view of the scrapers as detached from the cultivator; and Fig. 6 represents a side view of the seeder, also detached from the frame.

Similar letters of reference indicate corresponding parts in the several figures.

A is the frame or stock of my improved cultivator, constructed much after the manner of the frames of other hand-cultivators; but instead of being provided with the usual straight or forwardly-inclined teeth, it is provided with teeth $a$. Said teeth are of an inwardly-inclined or converging formation at their lower extremities, and of outwardly-bowed formation along their central and upper portions, for the purpose of cutting or cultivating close to the roots of plants without bruising or injuring the tops or limbs thereof, as illustrated in Fig. 1. Said teeth are also of a rearwardly-inclined formation along their central and upper portions, with their lower parts bent or curved forward, so as to bring their points upon a perpendicular line with their shanks, as illustrated in Fig. 2, thereby not only enabling the points the better to resist side pressure, but also the yielding or springing of the forwardly-inclined lower parts, which tends to direct the points deeper into the ground when meeting with more than ordinary resistance, is counteracted in a great measure by the yielding or springing of the rearwardly-inclined central portions, which tends to draw the points out of the ground. These teeth $a$ are secured to removable beams B B, which are attached to the frame A by means of bolts and nuts, or by other suitable means, and are adjustable or removable at pleasure by loosening or removing said bolts.

C C are rollers or wheels, rigidly secured upon a rotating axle, E, passing through the front part of the frame, and designed not only for sustaining the weight of that part of the frame, but also for rolling over the runners of strawberry and other vines, and holding the same firmly against the ground while they are being cut by the points of knives $b$, projecting downwardly from the frame A and beams B. Said knives $b$ are arranged in such manner as that their points will touch the ground near the point at which the rollers C C come in contact with the ground, so that by the forward movement of the machine the cutting points or edges of said knives *b* will be brought in contact with the runners of said vines at the same time they are being passed over and held down by the said rollers.

The beams B B, carrying the teeth *a*, may, when desirable, be removed and other beams B' B', carrying scrapers *a'*, may be similarly secured to the frame; or said scrapers *a'* may be inserted in the beams B B along with the teeth *a*, so as to dispense entirely with the beams B' B'. Said scrapers *a'* consist of vertical arms extending downward from the beams, and terminating about even with the surface of the ground into rectangular and laterally-extended blades, for cutting or shaving off the grass, weeds, and other spontaneous vegetation, which tend to the injury of the plants that are being cultivated.

H is an adjustable roller, provided at the rear of the frame A, and upon which that part of the frame is supported. Said roller H is arranged to rotate upon a frame, *h*, of a form and construction as shown in Figs. 3 and 4, and is arranged to revolve in a horizontal direction by means of the turning of a vertical portion of the forward extremity of said frame *h* within a vertical socket in the frame A, so that when the machine is made to deviate from a straight line said frame *h* may, by turning in its socket, allow the roller H to follow after the machine in a rolling manner without having to be lifted from the ground. By means of a vertical adjustment given to said roller by the relative raising or lowering of the frame *h* in its socket, the cultivating appliances attached to the frame A may be made to cut deep or shallow, as may be desirable.

The beams B B may be removed, when desirable, and instead thereof may be attached a seeder, D, in the same or a similar manner as are the beams B B. Said seeder consists of a box with a sliding inner bottom, *d*, through which is cut an opening or hole, *c*, for the downward passage of the seed; but the seed passing from the box into this opening comes against an outer bottom, *d'*, and is prevented from passing through except by the outward sliding of the inner bottom, so as to carry the opening *c* beyond the limits of the outer bottom. To effect this, a lever, *g*, is arranged in a vertical position and pivoted to a stud, *f*, projecting from the front side of the box. The lower end of said lever *g* is connected to the rear portion of the said sliding bottom *d* by means of connecting-rods *i i*, while the upper end is in position for being acted upon by pins *e*, projecting from the side of a disk, G, secured upon the rotating axle E, so that the action of the pins *e* upon the lever *g*, produced by the rotating of the axle, will cause the outward sliding of the inner bottom, *d*, thereby permitting the seeds contained in the opening *c* to fall to the ground. Any suitable spring attachment may be employed to effect the inward sliding of the said bottom after releasement of the lever *g* from each engagement with one of the pins *e*. Said pins *e* may be made removable, so that by the insertion within the disk G of a greater or less number of pins, the seeds may be planted closer together or farther apart, thereby providing for its applicability to the planting of seeds of various kinds.

I is an adjustable drill-opener, of a formation as represented in Fig. 6, and arranged in front of the box for opening the drill preparatory to the dropping of the seed.

I' I' are adjustable drill-closers, of a formation as represented in the same figure, and arranged behind the box for covering the seed after they have been dropped.

M is a marker supported upon the frame A by means of arms or supports *m m*, and is used in connection with the seeder for indicating, by marking upon the ground, the locality of the next succeeding drill. Said marker is of a formation and construction as represented in Figs. 2 and 3, reference being had to those parts of said figures represented in red outline.

It is preferred to have the point of the said marker M to touch the ground at a point even with the axial center of the rollers C C, so that in all the curves and turns made by the machine, the said marker will describe its line upon the ground at a uniform distance from the drill that is being planted.

What I claim as my invention, and desire to have secured by Letters Patent, is—

1. The attachable and removable curved teeth *a*, constructed and applied for operating substantially as herein described.

2. The attachable and removable scrapers *a'*, with horizontal cutting-edges, substantially as and for the purpose herein set forth.

3. The combination of the rollers C C and knives *b*, as applied to a cultivator, substantially as and for the purpose herein set forth.

C. H. JOHNSON.

Witnesses:
JOEL DAVIS,
ISAAC BIRD.